United States Patent [19]

Skaar

[11] Patent Number: 4,620,671

[45] Date of Patent: Nov. 4, 1986

[54] METHOD AND APPARATUS FOR TREATING WASTE PAPER SUSPENSIONS

[75] Inventor: Thomas F. Skaar, Green Bay, Wis.

[73] Assignee: J. M. Voith GmbH, Heidenheim, Fed. Rep. of Germany

[21] Appl. No.: 614,879

[22] Filed: May 29, 1984

[30] Foreign Application Priority Data

Jun. 3, 1983 [DE] Fed. Rep. of Germany ....... 3320125

[51] Int. Cl.4 .............................................. B02C 13/02
[52] U.S. Cl. ........................................ 241/19; 162/4; 162/57; 241/20; 241/21; 241/24; 241/46.17; 241/62
[58] Field of Search ......................... 241/57, 28, 16, 18, 241/19, 20, 21, 24, 46.02, 46.11, 46.17, 62; 162/4, 65, 63, 57, 55, 152; 209/3, 273

[56] References Cited

U.S. PATENT DOCUMENTS

| | | | |
|---|---|---|---|
| 3,116,028 | 12/1963 | Bidwell | 241/57 |
| 3,743,539 | 7/1973 | Kroyer et al. | 241/46.17 X |
| 3,909,397 | 9/1975 | Aldinger | 209/3 |
| 3,913,847 | 10/1975 | Glatt et al. | 241/46.17 X |
| 3,989,197 | 11/1976 | Neitzel | 241/46.17 X |
| 4,037,794 | 7/1977 | Melliger | 241/46.17 |
| 4,214,712 | 7/1980 | Van Hoorn | 241/46.17 X |
| 4,251,352 | 2/1981 | Shoemaker | 209/3 X |
| 4,252,641 | 2/1981 | Martin | 209/273 |
| 4,443,296 | 4/1984 | Lamort | 162/4 X |
| 4,532,006 | 7/1985 | Winters et al. | 162/15 LX |

FOREIGN PATENT DOCUMENTS 2459587 10/1975 Fed. Rep. of Germany ...... 209/273
2511435 9/1976 Fed. Rep. of Germany ........ 162/55

Primary Examiner—Mark Rosenbaum
Attorney, Agent, or Firm—Grimes & Battersby

[57] ABSTRACT

A process is provided for refining a pollutant laden suspension of waste paper using refining apparatus including a housing adapted to induce a turbulent flow in the suspension so as to separate the suspension into various fractions. Turbulent flow is created by the action of a rotary blade which is contained within a primarily rotation-symmetrical closed housing. The turbulent flow has a lower-pressure center about its axis. Along its radial edge, a fraction laden with heavy impurities or pollutants is removed while along the axial end where the rotary blade is positioned, a fraction of material is removed by a screen which is positioned next to the blade. Along the other axial end across from the end of the housing having the rotary blade, another fraction laden with pollutants is removed from the center. Air is fed directly into the refining apparatus where it is admixed with the suspension in order to facilitate separation of the suspension with the various fractions.

8 Claims, 2 Drawing Figures

METHOD AND APPARATUS FOR TREATING WASTE PAPER SUSPENSIONS

BACKGROUND OF THE INVENTION

The present invention relates generally to a method and apparatus for treating suspensions of waste papers and, more particularly, to such a method and apparatus which employs refining apparatus for separating the various pollutant laden-fractions of the waste paper suspension being refined. Separation is achieved primarily by the generation of a turbulent flow in the center of the apparatus by the use of a rotary blade. As a result of the turbulent flow being generated in the housing by the rotary blade, lightweight pollutants are drawn to and tend to accumulate in the center of the housing while the heavier pollutant particles are drawn to and tend to accumulate along the radial edges thereof. Separation is facilitated by the introduction of supplemental compressed air which is fed into the refining apparatus. The compressed air may, in one embodiment of the invention, be admixed with the water paper suspension being supplied to the refining apparatus.

The above described method is accomplished by the use of at least one air pipe which is connected to a suspension inlet pipe and, in certain instances, to a stirrer directing line of the apparatus.

Refining apparatus of this type has been used in the past. For example, similar apparatus is described in West German Patent No. DE-AS No. 25 14 162. Further, processes of the type described above are, oftentimes, used in waste paper treatment technology.

The apparatus of the present invention utilizes a rotary blade located within the housing of the apparatus in order to generate the turbulent flow within the housing. Such apparatus may be considered almost to be a secondary solubilizer of the material and in which the previously dissolved waste paper is further liquified and even partially despecked. The whirling action created by the turbulent flow makes it possible to separate the heavy impurities or pollutants by separately removing different fractions from the suspension. A fraction laden with heavy impurities is drawn off along the radial edge of the flow while a fraction laden with lighter impurities is removed from the center of the flow, i.e., along the extension of the rotor axis.

Against the foregoing background, it is a primary object of the present invention to provide a method for treating waste paper suspensions.

It is a further further object of the present invention to provide such a method wherein the operation of the apparatus is substantially more efficient than using heretofore known methods.

It is still a further object of the presentinvention to provide apparatus for effecting such method.

SUMMARY OF THE PRESENT INVENTION

The accomplishment of the foregoing objects is achieved by providing a method for the treatment of waste paper suspensions which utilizes refining apparatus adapted to separate various fractions laden with impurities or pollutants from the suspension being refined. Separation is accomplished principally by the generation of a turbulent flow in the center of the refining apparatus. By the generation of such turbulent flow, lightweight pollutants tend to accumulate in the center of the apparatus while the heavier particled pollutants tend to accumulate along the radial edge thereof. Separation is enhanced by the introduction of supplemental compressed air into the refining apparatus where it is admixed with the suspension being refined. The supplemental air may be introduced in the form of smaller air bubbles and, in a preferred embodiment, is fed into the center of the apparatus.

Specific apparatus is further disclosed for the accomplishment of the above-described method. Such apparatus employs refining apparatus which includes at least one compressed air pipe connected to the suspension inlet pipe. In certain instances, the at least one compressed air pipe is also connected to a stirrer directing line in the apparatus. Air is supplied to the appropriate feeding line through an injector which may be located in the suspension inlet pipe.

It has been found that by concentrating the suspension in the center of the refining apparatus using small air bubbles, the separation of the impurity components is improved. On the one hand, small hydrophobic plastic-foil particles accumulate on the tiny air bubbles and, on the other hand, the path of these particles in the direction of the center is further facilitated by the component of air. The supplemental air is removed with the fraction that is being eliminated from the flow center as well as propitiously in a hydrocyclone provided to further clean the fraction laden with the heavy impurities. From this hydrocyclone, the material is again returned to the center area of the turbulent flow in the apparatus.

BRIEF DESCRIPTION OF THE DRAWINGS

The foregoing and still other objects and advantages of the present invention will be more apparent from the following detailed explanation of the invention in connection with the accompanying drawings, wherein.

DETAILED DESCRIPTION OF THE PREFERRED EMBODIMENTS

Figure 1:
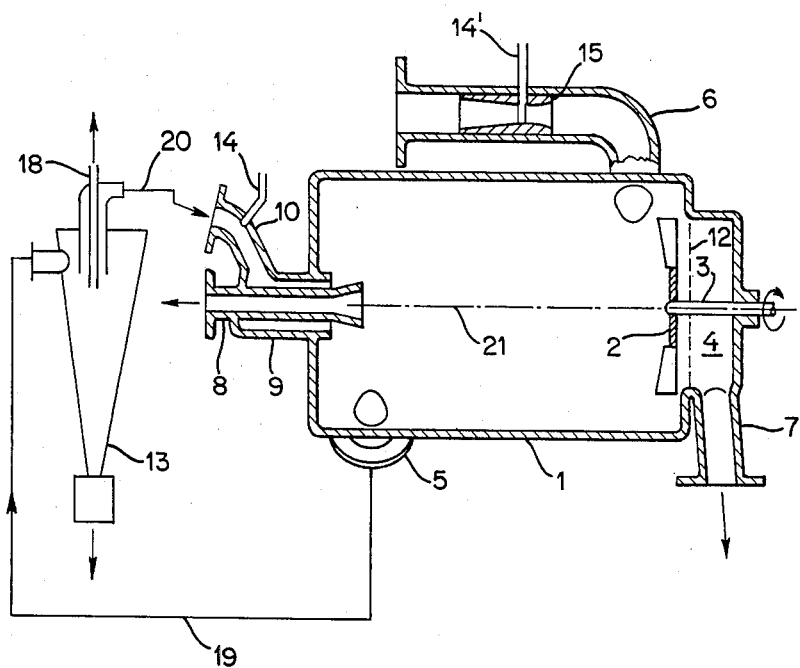
FIG. 1 diagrammatically illustrates a refining operation known as a secondary solubilizer of material with a despecking operation.

FIG. 1 diagrammatically illustrates the refining apparatus of the present invention which includes a primarily cylindrical housing 1 having an axis of rotation indicated by reference numeral 21. The waste paper adapted to be treated in the housing 1, which is typically in suspension form, is introduced directly into the housing 1 through an inlet nozzle 6. A rotary blade 2 is provided within the housing 1 and is adapted to rotate on a rotary shaft 3 located in axial alignment with the axis of rotation 21 of the housing 1. By rotation of the rotary blade 2, a turbulent flow is created in the suspension.

A substantially flat screen 12 is provided behind the rotary blade 2. The screen 12 is positioned vertically relative to the axes of rotation of the blade 2 and of the housing 1. The rotating action of the rotary blade 2 draws the suspension through the screen 12 with the refined suspension being initially received in a collection area 4 located behind the screen 12 for delivery out of the housing 1 through a nozzle 7 which is provided at the bottom of the collection area 4.

A further nozzle 5 is provided in the housing 1 opposite the rotary blade 2 for discharge of the fraction laden with heavy impurities. The heavy impurities laden fraction is then transmitted through a conduit 19 to a hydrocyclone 13 for further treatment and refining. The hydrocyclone 13 functions to remove gasses such as, for example, air, through a central exit piping 18.

The material treated in the hydrocyclone 13, after removal of the gasses through central exit piping 18, is then fed via conduit 20 to a pipe connection 10 at the housing 1. Pipe connection 10 leads to an annulus 9 which is positioned about a connecting socket 8, the function of which is to remove from the suspension being refined in the housing 1 a fraction laden with relatively lightweight impurities. A compressed air line 14 is provided in the pipe connection 10 for the introduction of compressed air into the housing, typically in the form of small air bubbles.

A supplemental air line 14' may also be provided instead of or in addition to the air line 14. Supplemental air line 14' is provided in the inlet nozzle 6 where the suspension for refining is initially introduced into the housing 1. Supplemental air line 14' is connected to an injector provided inside the inlet nozzle 6. In certain instances, it may be advantageous that the supplemental air line 14' introduces smaller dimensioned air bubbles than those introduced by air line 14.

Figure 2:
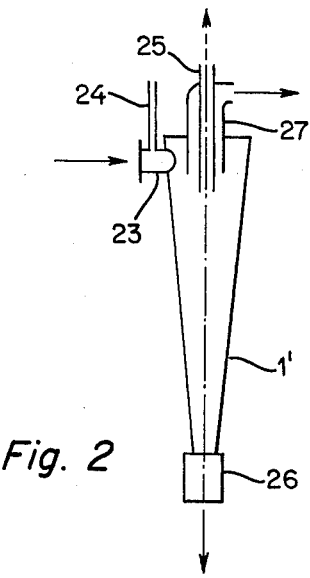
FIG. 2 diagrammatically illustrates a refining operation known as a hydrocyclone with turbulent flow.

Using the procedures described above, the operation of the turbulence refiner (which has become known as a hydrocyclone), can be improved as diagramatically illustrated in FIG. 2. Such turbulence refiners are cone-shaped having a substantially slender, tapered housing, around whose middle axis the turbulent flow is aligned. In the process of refining waste paper, the suspension is supplied to the housing 1' at relatively high speeds and under pressure through a connection pipe 23. The heavy impurities tend to collect along the housing edge 1' and are removed through a heavy particles outlet 26 at the apex of the cone-shaped housing 1'. Outlet 26 has been developed as a valve for heavy impurities. The refined suspension is adapted to exit the housing 1' through a central exit line 27. Further, a central pipe 25 is provided for removal of gases, particularly air, and lightweight impurities or contaminants from the center of the flow of the housing 1' where such gases and impurities tend to accumulate and collect.

Compressed air may be introduced into the housing 1' by a compressed air supply line 24 which is connected to an inlet nozzle 23 to the housing 1'. It has been found that by introducing such compressed air to the housing, particularly at the inlet nozzle 23, the removal of impurities, particularly lightweight impurities, is enhanced by the additional air supply.

Although the foregoing illustrates certain specific elements of the present invention, it will be appreciated that the teaching of this application encompasses broader and different combinations that recited herein. Accordingly, the present invention should be limited only by the true scope of the appended claims.

Wherefore I claim:

1. Refining apparatus adapted to refine a pollutant laden suspension of waste paper, said apparatus including a housing, means within said housing for inducing a turbulent flow in the suspension so as to separate said suspension into various fractions, at least one inlet pipe attached to said housing for delivering suspension to said housing, means for directly introducing air into said at least one inlet pipe for admixture with; the suspension in order to facilitate separation of said suspension into said various fractions, wherein said means for directly introducing air comprises at least one air injector connected to said at least one inlet pipe, said at least one air injector being adapted to introduce compressed air directly into said suspension prior to its introduction into said housing.

2. The apparatus of claim 1 wherein said at least one air injector is attached to a compressed air line.

3. The apparatus of claim 1 wherein said housing includes a rotary blade adapted to induce said turbulent flow in the suspension.

4. The apparatus of claim 3 wherein said housing includes a substantially flat screen positioned behind said rotary blade.

5. The apparatus of claim 4 wherein the rotary blade is adapted to rotate in such a direction that the suspension is drawn through the screen so as to form a refined suspension and wherein said refined suspension is received in a collection area behind said screen.

6. The apparatus of claim 1 wherein the apparatus includes means for discharging a heavy impurities fraction from the housing, means for processing said heavy impurities fraction to form a processed suspension and means for re-introducing the processed suspension into said housing for further treatment.

7. In a process for refining a pollutant laden suspension of waste paper using refining apparatus which includes a housing adapted to induce a turbulent flow in the suspension so as to separate said suspension into various fractions, said process including the steps of:

directly introducing relatively small bubble of air into said suspension for admixture therewith prior to said suspension being introduced into said housing introducing said suspension into said housing; and inducing a turbulent flow within said housin so as to separate said suspension into various fractions wherein said introduction of air facilitates separation of said suspension into said various fractions.

8. The process of claim 7 wherein as a result of the inducing of said turbulent flow, lightweight pollutants tend to accumulate in the center of said housing while pollutants of a heavier weight tend to accumulate along the radial edges of said housing.

* * * * *